(12) United States Patent
Barth

(10) Patent No.: US 7,458,806 B2
(45) Date of Patent: Dec. 2, 2008

(54) WASTE-LESS INJECTION MOLDING FAN GATE

(75) Inventor: David M. Barth, Northfield, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 243 days.

(21) Appl. No.: 11/426,350

(22) Filed: Jun. 26, 2006

(65) Prior Publication Data

US 2007/0298141 A1 Dec. 27, 2007

(51) Int. Cl.
*B29C 45/23* (2006.01)
(52) U.S. Cl. ...................... 425/564; 425/566
(58) Field of Classification Search ................ 425/562, 425/563, 564, 565, 566
See application file for complete search history.

(56) References Cited

U.S. PATENT DOCUMENTS

| | | | |
|---|---|---|---|
| 4,017,242 A | | 4/1977 | Mercer |
| 4,108,956 A | * | 8/1978 | Lee .............. 425/562 |
| 4,186,161 A | | 1/1980 | Ulmschneider et al. |
| 4,474,717 A | * | 10/1984 | Hendry ............ 264/572 |
| 4,529,372 A | | 7/1985 | Saumsiegle |
| 4,832,592 A | | 5/1989 | Saumsiegle |
| 5,009,587 A | | 4/1991 | Corvaglia et al. |
| 5,098,280 A | * | 3/1992 | Trakas ............ 425/549 |
| 5,501,594 A | | 3/1996 | Glozer et al. |
| 5,820,899 A | | 10/1998 | Gellert et al. |
| 5,846,466 A | * | 12/1998 | Abe et al. ............ 425/549 |
| 6,056,536 A | | 5/2000 | Schad et al. |
| 6,146,123 A | | 11/2000 | Lausenhammer et al. |
| 6,149,417 A | | 11/2000 | Lausenhammer et al. |
| 6,228,303 B1 | | 5/2001 | Voelkel |
| 6,355,197 B1 | | 3/2002 | Lausenhammer et al. |
| 6,645,417 B1 | | 11/2003 | Grove |

* cited by examiner

*Primary Examiner*—Tim Heitbrink
(74) *Attorney, Agent, or Firm*—Ronald W. Wangerow; Harness, Dickey & Pierce, P.L.C.

(57) ABSTRACT

An injection molding machine is provided including a first mold portion and a second mold portion, the second mold portion being movable relative to the first mold portion and together defining a mold cavity. The injection molding machine includes a fluid path extending through the first mold portion. The fluid path has an inlet fan gate portion in fluid communication with the mold cavity. The injection molding machine further includes a valve device disposed in the fan gate portion directly adjacent the mold cavity. The valve device is positionable in an opened position to permit flow of the molding material from the fan gate portion to the mold cavity and a closed position to obstruct flow of the molding material from the fan gate portion to the mold cavity. In the closed position, the valve device defines a wall surface portion for forming the molded part and thereby eliminating the need for a post-machining operation to remove the gate portion.

13 Claims, 3 Drawing Sheets

FIG 3
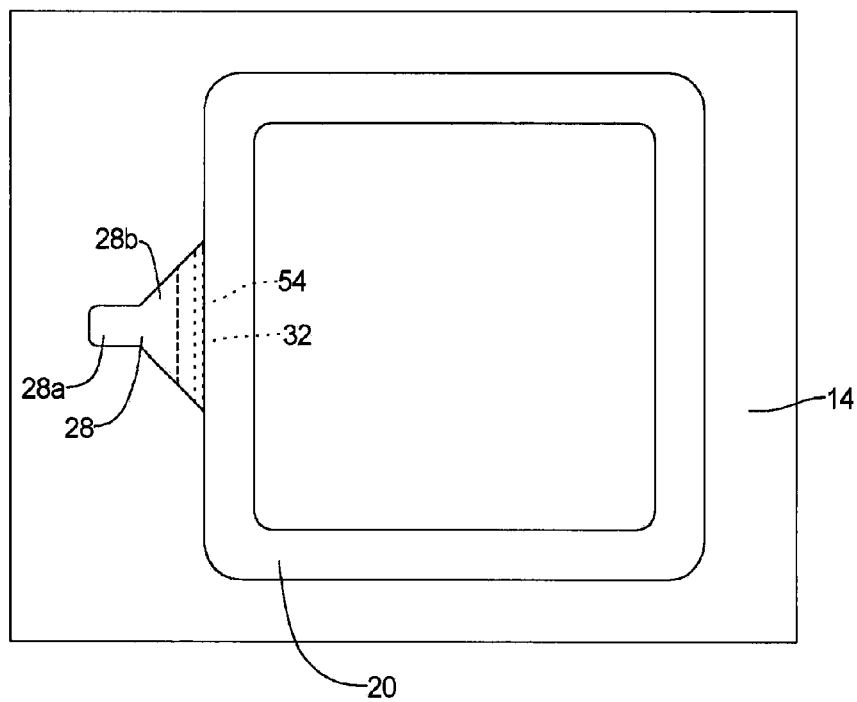
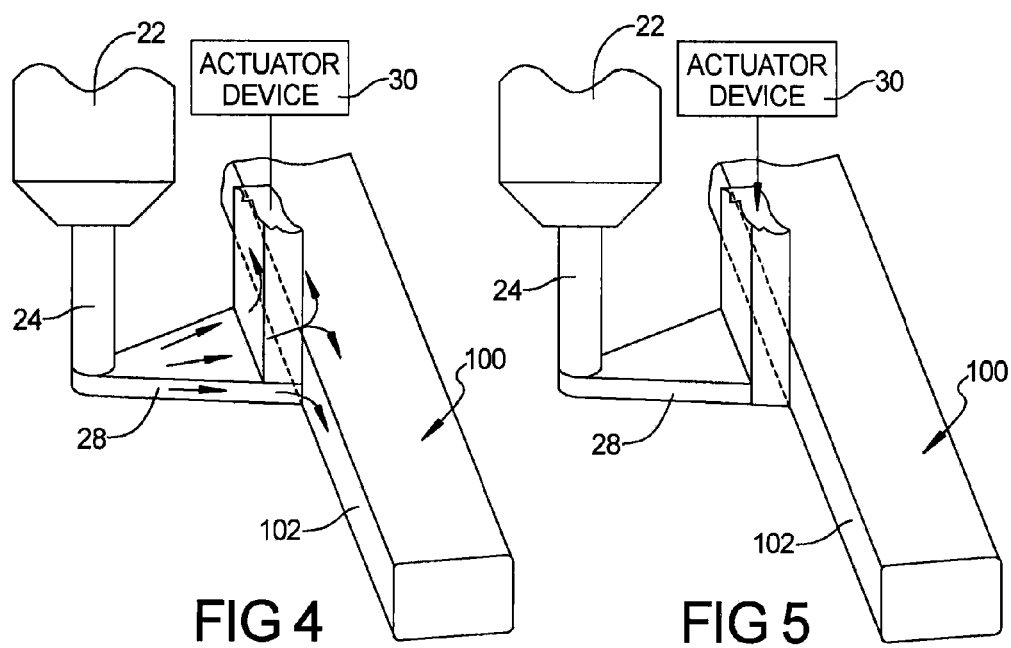
FIG 4        FIG 5

WASTE-LESS INJECTION MOLDING FAN GATE

FIELD

The present disclosure relates to injection molding devices and more particularly an injection molding device with a runner fan valve blade.

BACKGROUND

The statements in this section merely provide background information related to the present disclosure and may not constitute prior art.

As is widely known, injection molding of thermoplastic and thermoset materials is often used to form a variety of parts having intricate shapes and requiring close dimensional tolerances. Such injection molding may be accomplished using a wide variety of materials, such as thermoset and thermoplastic materials, rubber, or similar materials.

Many conventional injection molding machines employ a stationary plastic extruder operable to pass a material through a series of runners to one or a plurality of mold cavities. These mold cavities are formed between a pair of separable mold dies and are shaped to closely conform to a predetermined shape. A sprue and a plurality of runners are used to channel material to each mold cavity. That is, once the mold dies are closed, the extruder is actuated to inject a "shot" of material (i.e. plastic or rubber) into the sprue, runners, and mold cavities. The runners are often provided with a fan gate portion for introducing the molded material into the mold cavity. After the material has had sufficient time to solidify, the mold dies are separated and the parts ejected therefrom. Generally, when the parts are ejected from the mold dies, the runners (including the fan gate portion) and sprue associated therewith are also ejected coupled with the molded parts. The solidified runner and sprue material must be separated from the molded parts and finally discarded. In some instances, this discarded material may be recycled back into the manufacturing process. However, thermoset materials are not recyclable and often times, customer requirements may otherwise limit the amount of recycled material that may be used. As should be appreciated, when molding small parts with relatively large sprue and runner channels, the amount of discarded material can often exceed the amount of material that is permitted to be recycled. Therefore, this excess material may not be reused. This leads to increased costs associated with wasted material and disposal of the wasted material.

With injection molding, it is often necessary to perform further machining of the formed parts to achieve the desired surface treatments at these gating locations. The removing of the sprue and gated material and machining is typically necessary to achieve the desired final quality. Thus, it is desirable to select a location for the gating to minimize the need for post-molding machining, yet maintain proper material flow. This is particularly necessary in the forming of ring seals and cylindrical sleeves.

One attempt to simplify injection molding of thermoset parts has been the use of "cold runner" systems wherein the runners from the extruder to the mold cavity are maintained below a predetermined temperature. With this system, the thermoset material in the runners is maintained below the curing temperature with only the material in the mold cavity being solidified. Thus, the parts are ejected from the mold cavity with minimal gated material to be removed therefrom. The amount of sprue and gated material to be removed from the finished parts is greatly reduced with this system, however, the necessity for the removal of a small amount of gated material still exists.

Accordingly, there exists a need in the relevant art to provide an injection molding machine that is capable of fully eliminating the gated material from the molded part. Additionally, there exists a need in the relevant art to provide an injection molding machine that is capable of minimizing the need for post-molding machining.

SUMMARY

According to the principles of the present disclosure, an injection molding machine is provided having an advantageous construction. The injection molding machine includes a first mold portion and a second mold portion. The second mold portion being movable relative to the first mold portion and together defining a mold cavity. The injection molding machine includes a fluid path extending through the first mold portion. The fluid path has an inlet fan gate portion in fluid communication with the mold cavity. The injection molding machine further having a valve device disposed in the fan gate portion directly adjacent the mold cavity. The valve device is positionable in an opened position to permit flow of the molding material from the fan gate portion to the mold cavity and a closed position to obstruct flow of the molding material from the fan gate portion to the mold cavity. In the closed position, the valve device defines a wall surface portion for forming the molded part. For use with thermoset materials, the injection molding machine further includes a cooling assembly in thermal communication with at least a portion of the fluid path to maintain the thermoset molding material in an uncured state. Conversely, for use with thermoplastic materials, the injection molding machine may further include a heating assembly in thermal communication with at least a portion of the fluid path to maintain the thermoplastic molding material in a melted state.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a plan view of a mold dye illustrating the location of the fan valve blade within the fan gate portion of the molding dye;

FIG. 4 illustrates the flow of molding material to the runners, fan gate portion, and molding cavity with the fan valve blade shown in an open position during a molding operation; and FIG. 5 illustrates the fan valve blade in a closed position for closing off the flow of molding material from the runner and fan gate portion.

DETAILED DESCRIPTION

Figure 1:
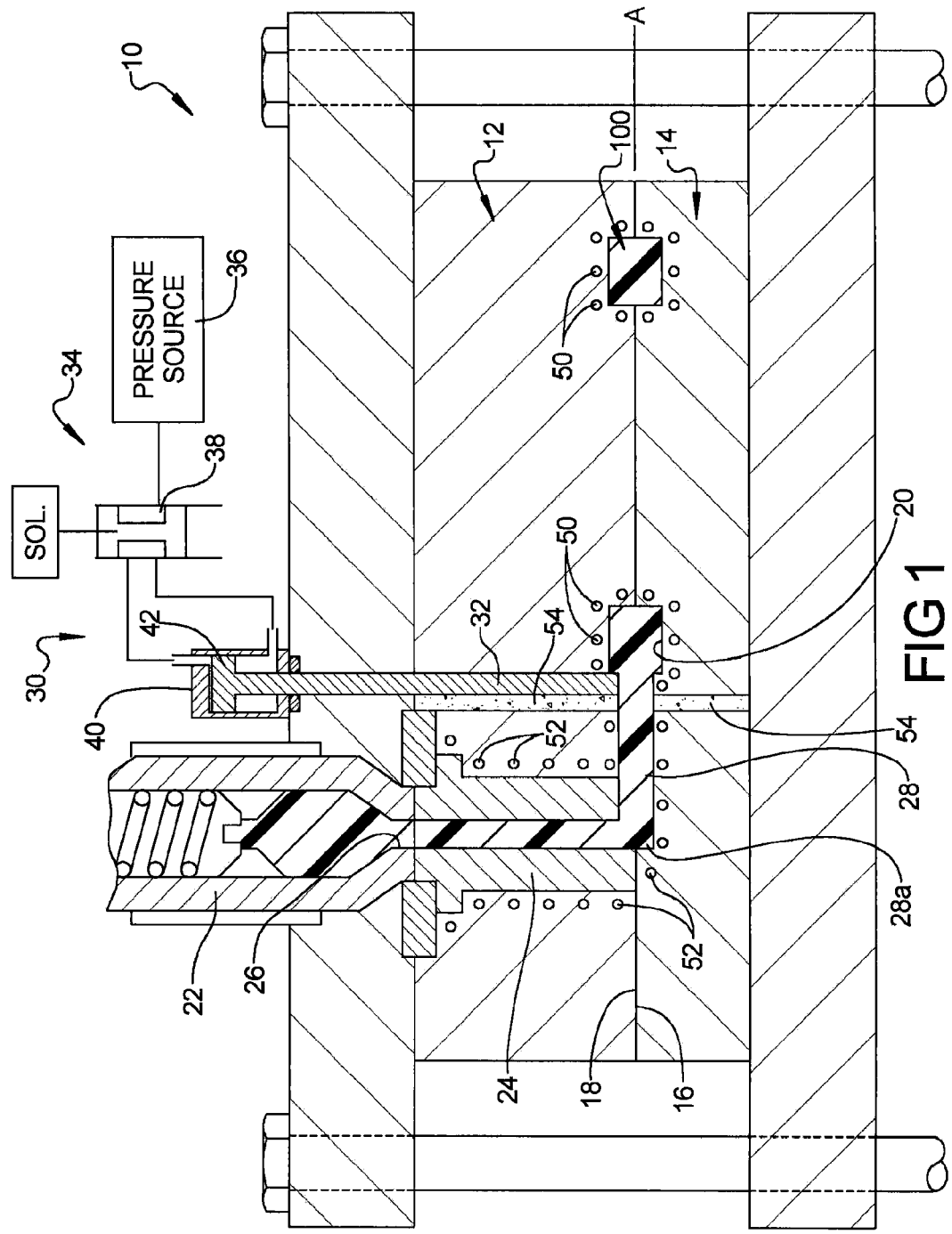
FIG. 1 is a cross-sectional view of an injection molding device, including a fan valve blade according to the principles of the present disclosure.

The following description is merely exemplary in nature and is not intended to limit the present disclosure, application, or uses. It should be understood that throughout the drawings, corresponding reference numerals indicate like or corresponding parts and features.

Referring now to FIGS. 1-5, an injection molding machine 10 is provided for forming a molded member 100. With regard to FIG. 5, molded member 100 is a seal ring. However, it should be understood that the principles of the present invention are equally applicable to a wide variety of parts and, thus, the present description should not be read to limit the scope of the present invention to any one particular product or part.

Briefly, as shown in FIG. 5, molded member 100 generally has an outer diameter portion 102, an inner diameter portion 104, a top portion 106, and a bottom portion 108. Each of these portions may intersect at a corner (as illustrated) or may be blended together such that no discernable edge is present. In the present embodiment, it is assumed that molded member 100 is to be used in such a way that top portion 106 and bottom portion 108 each engage a surface to define a sealing engagement. Therefore, it is desirable that top portion 106 and bottom portion 108 are free from defects, including gates, flow boundaries, and the like.

Figure 2:
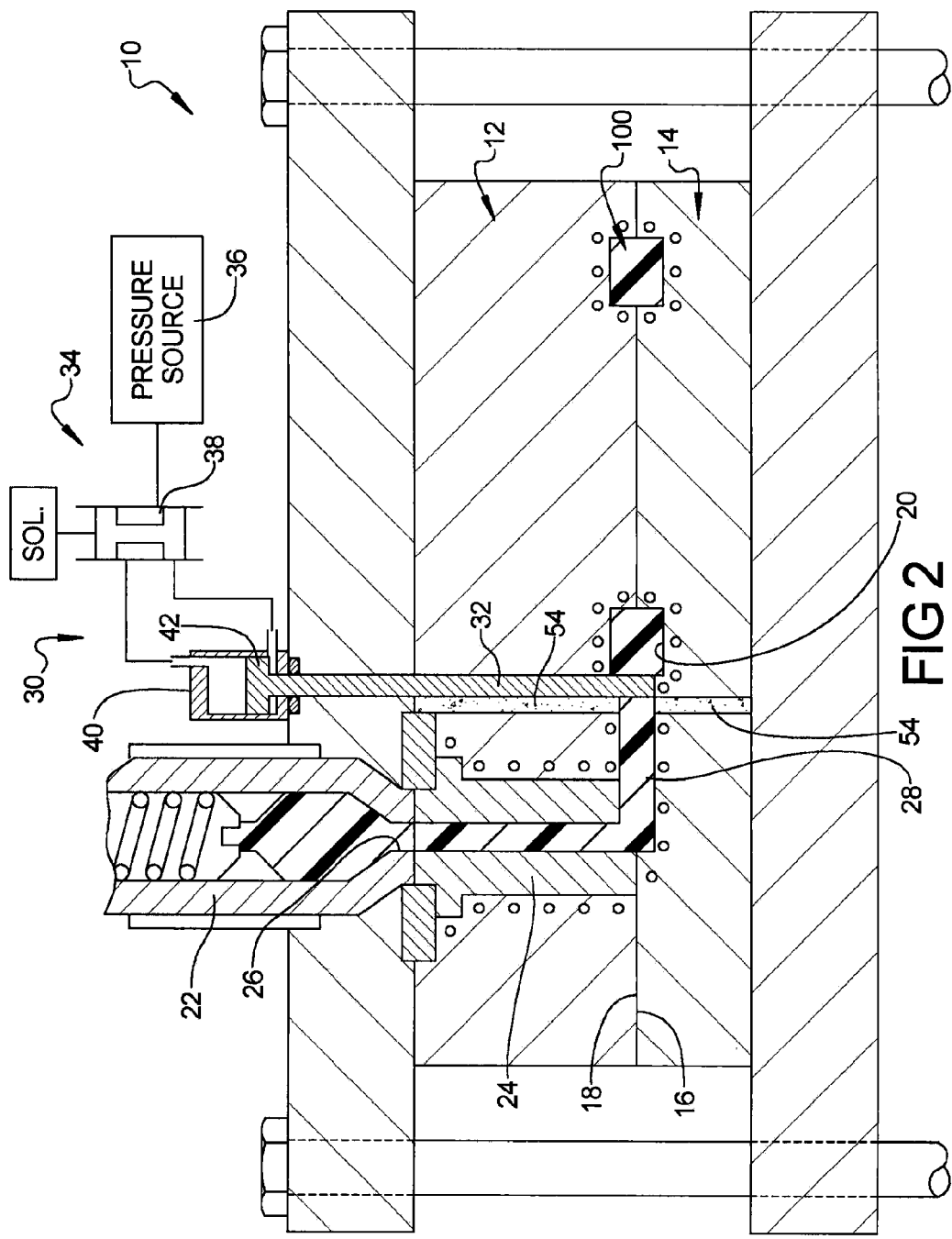
FIG. 2 is a cross-sectional view of the injection molding device of FIG. 1 with the fan valve blade shown in a closed position.

Referring now to FIGS. 1 and 2, injection molding machine 10 generally includes a first mold section 12 and a second mold section 14. First mold section 12 is movable relative to second mold section 14 along a straight path (generally vertical in FIGS. 1 and 2) and between an operative or closed position (see FIGS. 1 and 2), wherein a surface 16 of first mold section 12 abuts a surface 18 of second mold section 14 along a plane A, and an inoperative or opened position, wherein surface 16 of first mold section 12 is spaced apart from surface 18 of second mold section 14 to reveal a mold cavity 20. It should be understood that it is generally inconsequential whether first mold section 12 or second mold section 14 is movable, so long as they are movable relative to each other. Mold cavity 20 is formed to closely conform to the desired shape of molded member 100. Mold cavity 20 may be "upsized" to account for material shrinkage during molding.

Still referring to FIGS. 1 and 2, injection molding machine 10 further includes a nozzle member 22 in communication with a runner portion 24 provided in first mold section 12. Runner portion 24 is generally a cylindrical passage communicating with nozzle member 22. Nozzle member 22 is generally cylindrical and has a flanged top and is oriented normal to plane A and parallel to the movable path of first section 12. Nozzle member 22 includes a central bore 26 adapted to expel molding material there from into runner portion 24.

Runner portion 24 terminates at and is in fluid communication with a fan gate portion 28. Fan gate portion 28 has a narrow diameter end 28a communicating with said runner portion 24 and defines a wider diameter end 28b communicating with the mold cavity 20, as best seen in FIG. 3.

A fan gate valve device 30 is provided for closing off communication between the fan gate portion 28 and mold cavity 20. The fan gate valve device 30 includes a valve blade 32 and actuator device 34. The valve blade is movable between an open position, as illustrated in FIG. 1, for allowing the molding material to pass through runner 24 and fan gate portion 28 into mold cavity 20 during an injection molding operation. The actuator device 34 is operable to move the valve blade 32 to a closed position, as illustrated in FIG. 2, for closing off communication between the fan gate portion 28 and mold cavity 20. The valve blade 32 is disposed immediately adjacent to the mold cavity 20 so as to form a portion of the closed mold cavity 20 and thereby provide a finished molded part which does not require any post machining operation for removing the fan gate portion which is typically attached to the molded part in conventional molding processes.

As illustrated in FIG. 3, the valve blade 32 is disposed at the wider end portion 28b of the fan gate portion 28 and immediately adjacent to the mold cavity 20. As illustrated by FIG. 4, when the valve blade 32 is in the opened position, the molding material can flow from the nozzle 22 through the runner 24, fan gate portion 28, and into the mold cavity 20 filling the mold cavity to form a final product. When the valve blade 32 is moved to the closed position, as illustrated in FIG. 5, the communication between the mold cavity 20 and fan gate portion 28 is closed off and the valve blade 32 forms a barrier portion for forming the outer surface 102 of the molded product 100 in the area of the fan gate portion 28.

The actuator device 34 can take the form of an electronic solenoid actuator, a hydraulic actuator, or a pneumatic actuator. As illustrated in FIGS. 1 and 2, a pneumatic actuator is shown including a pressure source 36, a solenoid actuated valve member 38, and pressurized chamber 40. Pressurized air is selectively supplied to the pressurized chamber 40 for causing the valve blade 32 to move between an opened and closed position. The valve blade 32 can be connected to a piston member 42 disposed within the pressurized chamber 40. Operation of the solenoid valve member 38 between a first position, as illustrated in FIG. 1, causes the solenoid valve 38 to communicate pressurized air from pressure source 36 to the lower portion of pressurized chamber 40 to cause piston member 42 to move upward, as illustrated, thereby causing the valve blade 32 to move to the opened position. When solenoid valve 38 is moved to the position, as shown in FIG. 2, the pressurized source 36 is caused to communicate with the upper chamber of the pressurized chamber 40 causing the piston member 42 to move to the downward position, as illustrated, and causing the valve blade 32 to move to the closed position, as illustrated in FIG. 2. It should be understood that other types of actuating devices 30, including mechanical and electro-mechanical devices, as are known in the art can also be used for moving the valve blade 32 between an open and closed position.

For use with thermoset materials, the mold cavity 20 is provided with heating passages 50 adjacent thereto for heating the mold cavity 20 to cure the thermoset material injected therein. The runner 24 and fan gate portion 28 are each provided with cooling passages 52 adjacent thereto in order to prevent the thermoset material from curing prior to being injected into the mold cavity 20. Conversely, when being utilized with a thermoplastic material, the mold cavity 20 can be provided with cooling passages 50, and the runner portion and fan gate portion can be provided with heating passages. An insulating material 54 or an air gap is provided between the passages 50 and the passages 52 to isolate the "hot section from the "cold" section of the tool. The insulating material is preferably non-heat conducting. Further, the blade 32 may be provided with a layer of insulating material 54, as illustrated in FIG. 3, to isolate/prevent heat transfer through the blade from the hot section to the cold section. The insulating material 54 may be interior of the blade or on either or both exterior surfaces.

With the design of the present disclosure, the fan valve blade 32 can be used in any rubber or plastic mold that utilizes a fan gate for part filling. With the valve blade 32 open during the injection stage, the cavity 20 is filled with rubber or plastic material. Then, after the part is full, the blade closes, shutting off the flow of material and holding pressure into the cavity. The part is then de-molded and is ready to be packed and shipped without further machining operations. Current fan gates require a trim operation to remove the gate portion. The system of the present disclosure saves the labor of removing the gate, plus the waste of the gate material itself. The design also enables molding with higher viscosity materials because a deeper fan gate is possible. Current fan gate designs are typically limited to 0.006 inches (0.15 mm) because a larger gate depth would result in a torn out cross-section during gate removal. This design could have the gate depth up to two-thirds as large as the part cross-section with no adverse affects.

What is claimed is:

1. An injection molding apparatus, comprising:
    a first mold member defining a portion of a mold cavity;
    a second mold member defining a portion of said mold cavity, wherein at least one of said first and second mold members defines a fan gate portion in communication with said mold cavity;
    an injection nozzle in communication with said fan gate portion; and
    a valve member perpendicularly disposed at an interface between and relative to said mold cavity and said fan gate portion, said valve member being movable between an open position and a closed position for closing off communication between said fan gate portion and said mold cavity.

2. The injection molding apparatus according to claim 1, wherein said fan gate portion has a first diameter at a first end proximate to said injection nozzle and a second diameter wider than said first diameter proximate to said mold cavity, said valve member having a diameter approximately equal to said second diameter.

3. The injection molding apparatus according to claim 1, wherein said valve member is connected to an actuator device.

4. The injection molding apparatus according to claim 3, wherein said actuator device includes a hydraulic actuator.

5. The injection molding apparatus according to claim 3, wherein said actuator device includes a pneumatic actuator.

6. The injection molding apparatus according to claim 3, wherein said actuator device includes an electronic solenoid actuator.

7. The injection molding apparatus according to claim 1, wherein said fan gate portion includes a means adjacent thereto for maintaining said fan gate portion below a predetermined cure temperature.

8. The injection molding apparatus according to claim 7, wherein said mold cavity includes means adjacent thereto for heating said mold cavity to a cure temperature.

9. The injection molding apparatus according to claim 8, further comprising insulating means for isolating heat transfer between said fan gate portion and said mold cavity.

10. The injection molding apparatus according to claim 1, wherein said fan gate portion includes a means adjacent thereto for heating said fan gate portion above a predetermined melting temperature.

11. The injection molding apparatus according to claim 10, wherein said mold cavity includes means adjacent thereto for cooling said mold cavity below a predetermined temperature.

12. The injection molding apparatus according to claim 11, further comprising insulating means for isolating heat transfer between said fan gate portion and said mold cavity.

13. The injection molding apparatus according to claim 1, wherein said valve member includes a layer of insulating material for isolating heat transfer between said fan gate portion and said mold cavity.

* * * * *